(12) United States Patent
Do

(10) Patent No.: US 6,233,446 B1
(45) Date of Patent: *May 15, 2001

(54) ARRANGEMENT FOR IMPROVING SECURITY IN A COMMUNICATION SYSTEM SUPPORTING USER MOBILITY

(75) Inventor: Thanh Van Do, Oslo (NO)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/413,219

(22) Filed: Oct. 5, 1999

Related U.S. Application Data

(63) Continuation of application No. PCT/NO98/00109, filed on Apr. 2, 1998.

(30) Foreign Application Priority Data

Apr. 8, 1997 (NO) .................................... 971605

(51) Int. Cl.$^7$ .................................... H04Q 7/20
(52) U.S. Cl. .................... 455/410; 455/411; 455/422; 455/461
(58) Field of Search .................. 455/410, 411, 455/403, 422, 461, 560, 561, 435; 704/103; 709/205, 218; 380/247, 248, 271

(56) References Cited

U.S. PATENT DOCUMENTS

| | | | |
|---|---|---|---|
| H1837 | * 2/2000 | Fletcher et al. | 455/433 |
| 5,291,479 | 3/1994 | Vaziri et al. | |
| 5,509,053 | 4/1996 | Gowda et al. | |
| 5,572,528 | 11/1996 | Shuen | |
| 5,608,447 | 3/1997 | Farry et al. | |
| 5,615,351 | 3/1997 | Loeb | |
| 5,765,108 | * 6/1998 | Martin et al. | 455/422 |
| 5,825,759 | * 10/1998 | Liu | 370/331 |
| 6,052,589 | * 4/2000 | Persson et al. | 455/433 |
| 6,073,010 | * 6/2000 | Dufour | 455/422 |

FOREIGN PATENT DOCUMENTS

| | | |
|---|---|---|
| 0 684 741 A1 | 11/1995 | (EP) . |
| 95/35611 | 12/1995 | (WO) . |
| 96/25012 | 8/1996 | (WO) . |

OTHER PUBLICATIONS

IEEE 46$^{th}$ Vehicular Technology Conference, Apr. 28–May 1, 1996, Atlanta, Georgia, pp. 1825–1829, van Thanh et al., "Making Mobility Transparent to the Applications".

Telektronikk, vol. 90, No. 2, 1994, Norway, pp. 72–79, T. Handegærd, "The TINA Consortium".

International Conference on Network Protocols, Nov. 1995, Tokyo, Japan, pp. 296–304, Choong Seon Hong et al., "Service and connection management architecture for distributed multimedia application".

IEEE Communication Magazaine, vol. 36, No. 3, Mar. 1998, France, Juan Pavón et al., pp. 72–79, "COBRA for Network and Service Management in the TINA Framework".

* cited by examiner

Primary Examiner—Nay Maung
(74) Attorney, Agent, or Firm—Nixon & Vanderhye P.C.

(57) ABSTRACT

The present invention relates to an arrangement for improving security in a communications system, especially a telecommunications system, said system comprising distributed hardware and software components which interact in order to provide services to one or more users, and for the object of implementing this improvement this can according to the present invention be done by introducing in said system a generic access control. In a specific embodiment the invention suggests three types of access control especially related to access to the terminal in question, to the telecom system and to the requested services.

7 Claims, 5 Drawing Sheets

The Information object Term_Profile

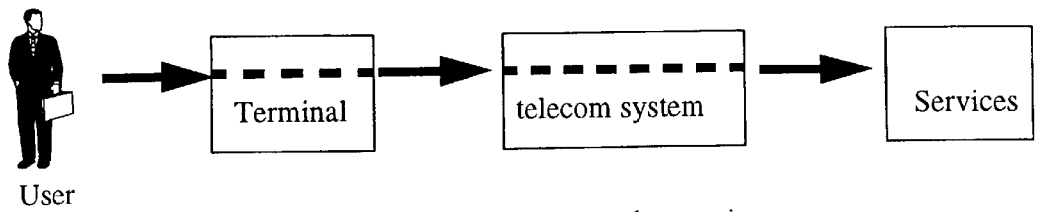
Figure 1   The user's access to the services
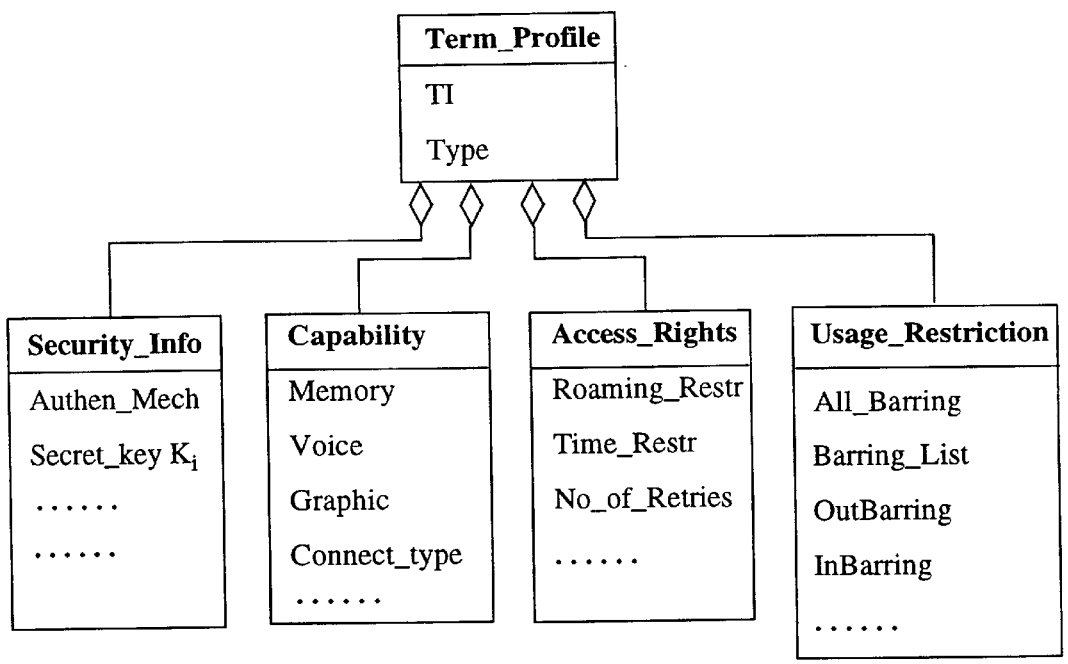
Figure 2   The Information object Term_Profile

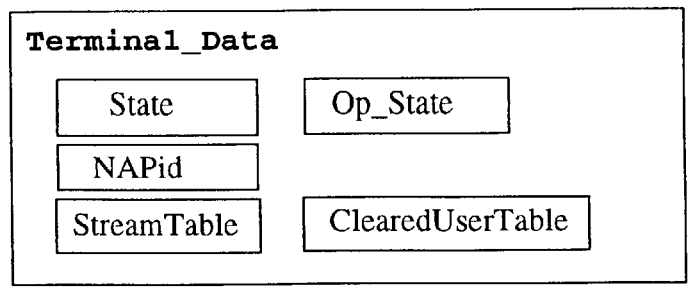
Figure 3  The Terminal_Data object
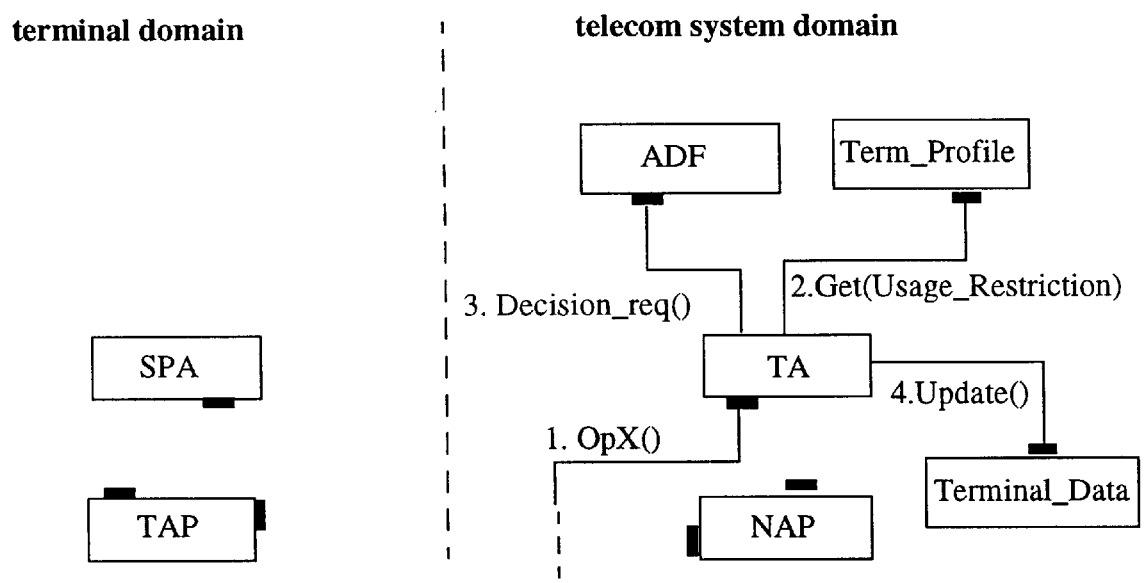
Figure 4  A computational model of the access control of the user for use of the terminal

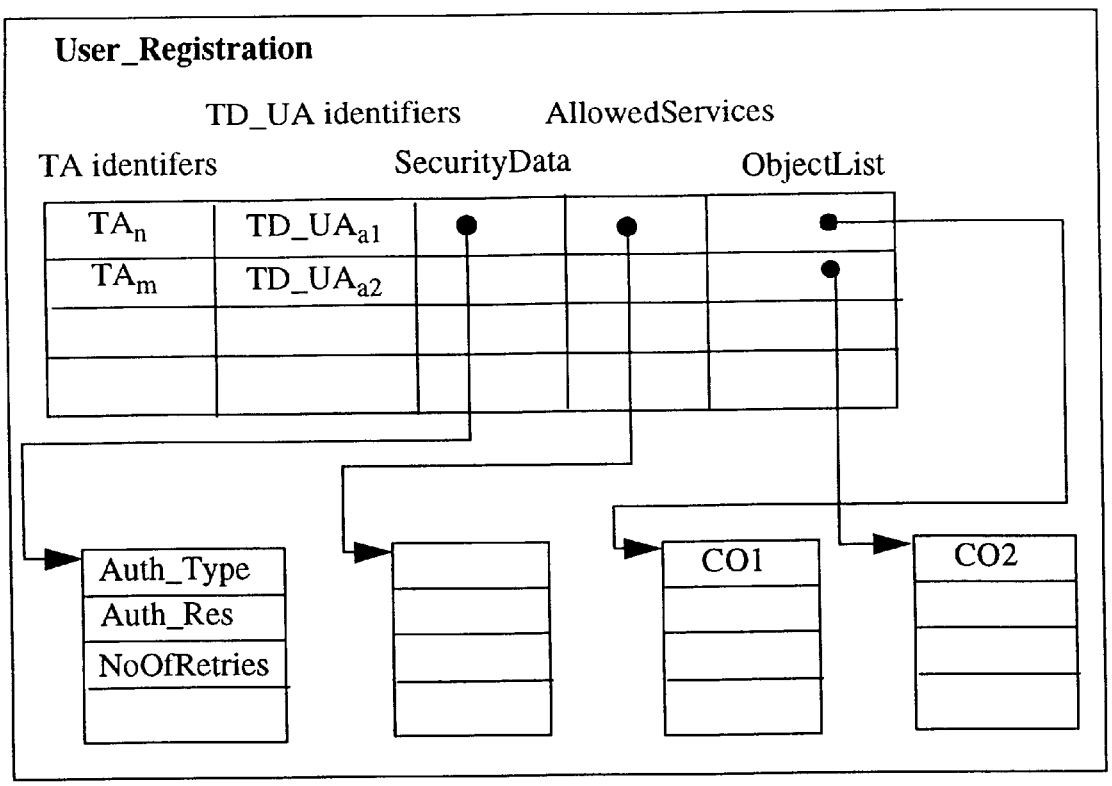
Figure 5  A User_registration object containing the list of allowed services

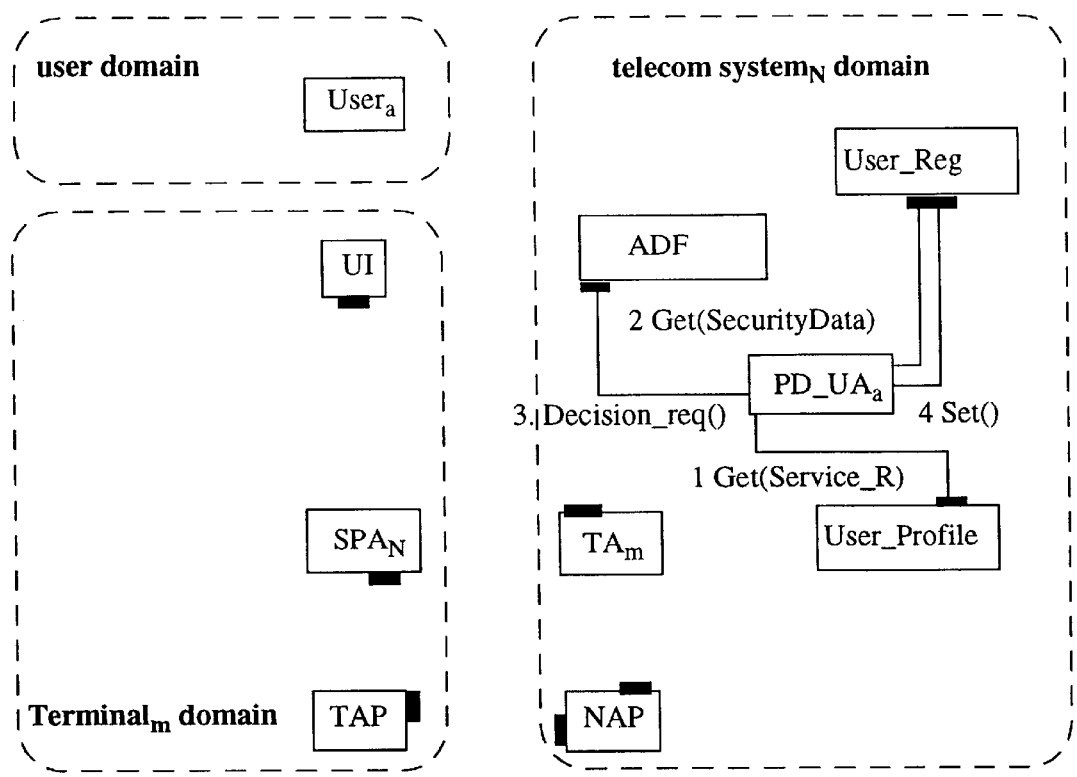
Figure 6    access control on the access to the telecom system

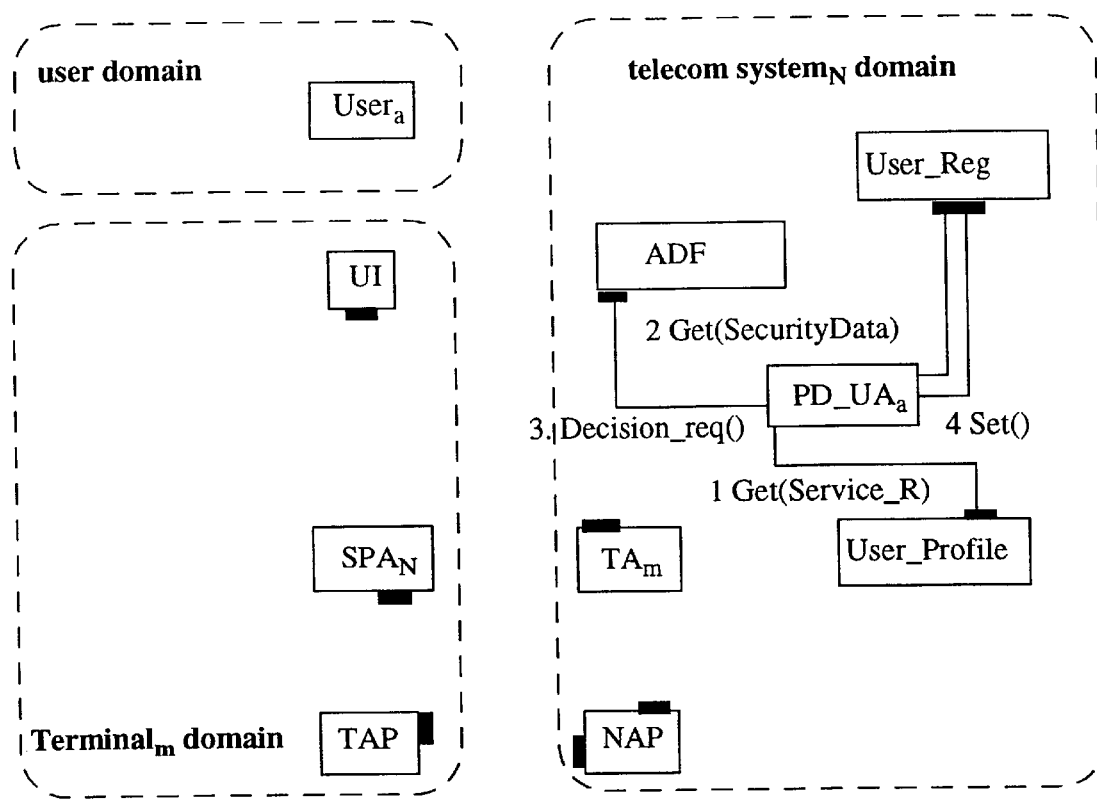
Figure 7   access control on the access to the telecom system

ARRANGEMENT FOR IMPROVING SECURITY IN A COMMUNICATION SYSTEM SUPPORTING USER MOBILITY

This is a continuation of PCT application No. PCT/NO98/00109, filed Apr. 2, 1998, the entire content of which is hereby incorporated by reference in this application.

FIELD OF THE INVENTION

The present invention relates to an arrangement for improving security in a communications system, especially a telecommunications system, said system comprising distributed hardware and software components which interact in order to provide services to one or more users.

More specifically the present invention concerns a user access control for distributed systems that support user mobility, i.e. users are allowed to move and use different terminals to access services.

BACKGROUND OF THE INVENTION

The Access control is the procedure used by the telecom system domain to ensure that the user accesses the telecom system domain in accordance with the restrictions specified at subscription [1]. When mobility is supported, every user will have the possibility to use any terminals at any access points. The access control procedure is also intended to limit the access capability of a user for the protection and privacy of third party. The third party can be the owner of the terminal or the access point, and must have the right to block or deblock, suspend or reset the service delivery at his terminal or access point to a user.

When the user is allowed to move and access to the telecommunication services anywhere and at any time, the risk of threats increases dramatically at the same time as the mechanisms necessary to enforce security become more difficult to realise. In systems supporting general mobility, fraudulent use of anyone's subscription can be attempted from any terminal and at any network access point. In this way the user may be exposed to various forms of fraud as, for example, fraudulent use of the user's resources by unauthorised parties who manage to take up the identity of the user, eavesdropping, unauthorised tapping or modification of information exchanged during communication, and disclosure of the user's physical location [4]. Another security problem arises because the user is allowed to use any terminal and at any network access point. Such a temporary usage may conflict with the use of the terminal by the terminal owners, also referred to as third parties [6]. In principle, third parties should not suffer in terms of loss of privacy or freedom of actions as a result of activities by the mobile user.

STATE OF THE ART

With mobility, users may make use of any existing and available terminals and network access points. However, this does not mean that the terminal owner (the third party) has to accept such actions on his terminal. He must have the rights to restrict the usage of the terminal, e.g. only allowing certain users while others are prohibited from using the terminal.

This may be done in many ways, e.g. by keeping the terminal in a secured place, use local password, etc., but such measures are cumbersome for the owner and often not secure enough. This is commonly referred as the protection of third parties.

The UPT (Universal Personal Telecommunication) [4] system comprises some sort of access control mechanisms but they are limited to telephony services and to voice terminals or telephone.

Consequently, there is a need for an improved user access control for distributed systems supporting user mobility.

OBJECTS OF THE INVENTION

The present invention has for an objective to address any mobile distributed system, any types of applications, i.e. voice, data, image, video, interactive, multimedia, etc., for in such mobile distributed systems to introduce an improved access control.

A further object of the present invention is to introduce a generic access control in such distributed systems.

Still another object of the present invention is to introduce such a generic access control for distributed systems supporting user mobility which can be used in mobile distributed systems comprising public or private, local-area or wide-area, wireline or wireless networks.

BRIEF DISCLOSURE OF THE INVENTION

The above objects are achieved in an arrangement as stated in the preamble, which primarily is characterised by introducing in said system a user access control, for thereby enforcing security in communications systems.

In other words, the invention also suggests that this type of generic access control is related to personal mobility.

Further features and advantages of the present invention will appear from the following description taken in conjunction with the enclosed drawings, as well as from the appending patent claims.

BRIEF DISCLOSURE OF THE DRAWINGS

FIG. 1 is a schematic diagram illustrating the main subject matter to which the present invention is related, namely by illustrating a user's access to the services in question.

FIG. 2 is a schematic diagram illustrating an embodiment of the present invention for carrying out access control, especially in relation to a information object Term_Profile.

FIG. 3 is a schematic diagram illustrating an embodiment of a Terminal_Data object.

FIG. 4 illustrates a computational model of the access control of a user for use of a terminal.

FIG. 5 is a schematic diagram illustrating a user_registration object containing a list of allowed services.

FIG. 6 is a schematic diagram illustrating the relation between user domain, terminal domain and telecom system domain as well as an embodiment of access control on the access to the telecom system.

FIG. 7 is a block diagram illustrating the relation between user domain, terminal domain and telecom system domain, as well as an embodiment of access control on the axis to the telecom system.

DETAILED DESCRIPTION OF EMBODIMENT

As stated previously, the present invention relates to user access control for distributed systems that support user mobility which means that the users are allowed to move and use different terminals to access services available to them.

In FIG. 1 there is illustrated a user which has access to a terminal which in turn is communicating with a telecom system which in turn is offering a plurality of services.

Before allowing the user to access the services offered by the telecom system domain, he is subject to three types of access control access control concerning the use of the current terminal (protection of third party)

access control concerning the access to the telecom system access control concerning the use of the service requested Solution We shall successively describe the three mentioned access controls.

Access Control for Use of the Current Terminal

With mobility, users may make use of any existing and available terminals and network access points. However, this does not mean that the terminal owner (the third party) has to accept such actions on his terminal. He must have the rights to restrict the usage of the terminal, e.g. only allowing certain users while other are prohibited from using the terminal. Of course, there are many ways to do this locally, e.g. keep the terminal in a secure place, use local password, etc. but they are cumbersome for the owner and often not secure enough. This is commonly referred as the protection of third parties [2].

Let us suppose that the mobile distributed system uses agent techniques to support mobility and has the following objects:

PD_UA (ProviderDomain_UserAgent) representing a user in the telecom system domain.

TA (TerminalAgent) representing a terminal in the telecom system do main

SPA (ServiceProvider Agent) representing the telecom system in the terminal domain NAP representing a Network Access Point TAP representing a Terminal Access Point The information required for to carrying out the access control is contained in the Usage_Restriction component of the object Term_Profile (see FIG. 2) which contains information about the terminal. The attribute All_Barring is used to specify that only the terminal owner can use the terminal. The terminal owner may also prevent a particular user or group of users from using his terminal by specifying the attribute Barring_List or to allow only certain user by specifying an Allowance_List. Modification of the Usage_ restriction may be provided as an application where only the owner has the right to make access. The details of such an application and the specific layout of the Usage_Restriction is a matter of implementation and will not be carried further here.

In order to support selective access control of the terminal, the object Terminal_Data which contains information required for the support terminal mobility such as state, NAPid, etc. may be equipped with a table of controlled and cleared users, called ClearedUserTable, as shown in FIG. 3. The ClearedUserTable contains the references or CIIs (Computational Interface Identifier) of the PD_UAs whose access have been controlled.

The TA assumes the Access control Enforcement Function (AEF). The Access control Decision Function is allocated to an object called ADF. The access control Procedure for use of the terminal is shown in FIG. 4.

1. Every time an operation OpX arrives at the TA, the TA will check whether the identifier of the originating or addressed PD_UA is on the ClearedUserTable or not. If it is, TA will do the transfer of OpX If it is not, TA will initiate the access control Procedure.

2. TA invokes Get(Usage_Restriction) on Term_Profile to acquire the access control Decision Information (ADI).

3. The TA invokes the operation Decision_Request on the ADF object. The arguments of this operation are the ADI obtained from the Term_Profile. The ADF makes the decision and returns the Access_Result to TA. The Access_result may be granted or not_granted. If the Access_Result is not_granted, TA returns an error message to the originator of the operation.

4. If the Access_Result is granted, TA invokes the operation Update(CleareduserTable,PD_UARef) on Terminal_Data to register the PD_UA of the newly cleared user.

One way of removing entries from ClearedUserTable, i.e the identifier (reference) of a PD_UA, is to restart a timer each time that entry is accessed. If the timer times out, the entry is removed. Some entries may be permanent, i.e. they are not associated with a timer.

This type of access control is only intended to other users than the terminal owner himself. In fact, the terminal owner should never be prevented to use his terminal. The access to the telecom system domain and the access to the services are different types of access controls which are applicable to all the users including the terminal owner.

In the object Usage_Restriction it is therefore necessary to define an additional attribute called NoRestr_List containing the PD_UA identifiers of the users who are by default allowed to use the terminal. The identifier of the terminal owner's PD_UA is one of them. This list must not be accessible to anyone but the telecom system domain operator itself, i.e. even not to the terminal owner. However, it may be possible to define an "emergency user", i.e. every call to an emergency number will be effectual without being checked by the access control service.

Access Control for Access to the Telecom System Domain

If the user is allowed to use the terminal, it does not necessarily mean that he is allowed to access the telecom system domain. He may be located outside the roaming area; his credit with the operator may have run out; the authentication mechanism used to authenticate him may also be too weak and he is allowed to access a limited set of services. The list of allowed services for a user at a terminal is hence equal to or smaller than the list of subscribed services. This list is a column in the User_Registration object in FIG. 5.

The initiator of the access control service is $User_a$. The target is the telecom system domain. The AEF is assumed by the $PD\_UA_a$. The ADF is assumed by the object ADF. The access of the user to the telecom system domain may be limited by some parameters such as Roaming_Restriction, Credit_Limit, Time_Restriction, etc. which are contained in the Service_Restriction attribute of the User_Profile object. The Service_Restriction attribute contains also a list of subscribed services. The use of the services in this list may be conditioned by the strength of the method used to authenticate the user, the location of the terminal, the call destination, etc. The Service_Restriction attribute may thus be quite complex.

A computational model of the access control service for access to the telecom system domain is shown in FIG. 6. The access control procedure is as follows:

1. The PD_UAa object invokes a Get(Service_Restriction) on the User_Profile to acquire the access control Decision Information (ADI).

2. The PD_UAa object invokes a Get(SecurityData) on the User_Registration object to acquire the contextual information (result from the authentication service).

3. The $PD\_UA_a$ object invokes the operation Decision_Request on the ADF object. The arguments of this operation are the ADI obtained from User_Profile and the contextual information obtained from User_Registration.

The ADF may use the access control services offered by the platform or a security system to obtain further contextual information such as time, system status, etc. and the access control policy rules. The ADF makes the decision and returns the Access_Result to PD_UAa together with SecurityData and AllowedServices.

The Access_result may be granted, not_granted or suspended. If the Access_Result is Suspended, depending on the access control Policy the terminal will be, temporarily or permanently no longer allowed to access the telecom system domain.

If the Access_Result is not_granted, the SecurityData returned to the $PD\_UA_a$ from the ADF will contain a NoOfRetries field increased by one. The NoOfRetries field indicates the number of unsuccessful access attempts and is used as contextual information for the next access control service. The PD_UA$_a$ will invoke the operation Set (SecurityData) on the User_Registration object to save the updated SecurityData. Depending on the operation which initiated the access control procedure, the PD_UA$_a$ will return the appropriate response containing a not_granted status.

When the Access_Result is granted, the AllowedServices containing an updated list of allowed services is returned to the PD_UA$_a$. The PD_UAa will invoke the operation Set(AllowedServices) on the User_Registration object to save the updated AllowedServices. Depending on the operation which initiated the access control procedure, the PD_UA$_a$ will return the appropriate response containing a granted status.

The user can now request the wanted service and is hence subject to the access control for the requested service.

Access Control for the Requested Service

There are two types of services, outgoing and incoming. Outgoing services are initiated by the user himself while incoming services are delivered to him by other users or applications.

For outgoing services, the initiator of the access control service is Usera. For incoming services the initiator is some other user or application. The target is the requested service. The AEF is assumed by the PD_UA$_a$. The ADF is assumed by the object ADF. The access of the user to the requested service is limited by the information contained in the AllowedService list of the User_Registration object. Another restriction originates from the Usage_Restriction contained in the object Terminal_Data and set by the terminal owner. The terminal owner may allow only one or both of the two service types to be performed on his terminal. The attributes OutBarring and InBarring of the Usage_Restriction is used to specify, respectively, the users who are not allowed to use outgoing services and incoming services on the terminal (or who are allowed).

The access control procedure is as follows:

1. The PD_UA$_a$ object receives a ServiceReq(ServId) from either the user or an application.

3. The PD_UAaobject invokes a Get(Usage_Restriction) on the TA.

3. The PD_UA$_a$ object invokes a Get(AllowedService) on the User_Registration.

2. The PD_UA$_a$ object invokes the operation Decision_Request on the ADF object. The arguments of this operation are the ADI obtained from the User_Registration object and the TA.

The ADF makes the decision and returns the Access_Result to PD_UA$_a$. The Access_result may be granted or not_granted. Depending on the operation which initiated the access control procedure, the PD_UA$_a$ will return the appropriate response to the requester. The access control on the requested service is shown in FIG. 7.

MERITS OF THE INVENTION

This invention has high level of flexibility in the sense that it can be used in different mobile distributed systems, public or private, local-area or wide-area, wireline or wireless.

It is a complete access control in the sense that it contains all the three types of access control.

Important features of the invention may be listed as follows.

What is claimed is:

1. An arrangement for improving security in a communications system including distributed hardware and software components which interact in order to provide services to one or more users, the arrangement comprising:

an access control system or function relating to personal mobility provided in said communications system for enforcing security;

wherein said access control system or function subjects a user to at least the following types of access control which are carried out in the following order: a) access control to a terminal verifying that the user is authorized to use the terminal, b) access control to a telecom system related to said communications system for checking whether the user is authorized to access the telecom system so as to enable prevention of the user from accessing the telecom system if the user is not authorized to do so, and c) access control to a requested service for checking whether the user is authorized to use the specific requested service;

wherein the user can thus move between and user different terminals, and the user can subscribe to and services in addition to a voice communication service; and wherein said access controls a) through c) are carried out before the user is allowed access to the requested service provided by the communications system.

2. Arrangement as claimed in claim 1, wherein said access control system is introduced in any Open Distributed Processing (ODP) system and/or any common Request Broker Architecture (CORBA) system.

3. Arrangement as claimed in claim 1, wherein the information required for carrying out said access controls is contained in a Usage Restriction component of a Term Profile object containing information about a terminal in question.

4. Arrangement as claimed in claim 3, further comprising a Terminal data object containing information required or supporting terminal mobility, said object also comprising a table of controlled and cleared users.

5. Arrangement as claimed in claim 4, wherein said Term Profile object and said Terminal Data object are found in the telecom system domain, and are controlled by agent techniques comprising a Terminal Agent (TA).

6. Arrangement as claimed in claim 3, wherein in the telecom system domain there is provided one or more timers which are restarted each time an entry is accessed, the setting of a timer deciding the maintenance of said entry, and wherein entries not associated with a timer are regarded as permanent entries.

7. A method of improving security in a communications system including distributed hardware and software components which interact in order to provide services to one or more users, the method comprising:

providing an access control system or function relating to personal mobility in the communications system for enforcing security;

said access control system or function performing the following access controls on a user in the following order: a) access control to a terminal verifying that the user is authorized to use the terminal, b) access control to a telecom system related to said communications system checking whether the user is authorized to access the telecom system and preventing the user from accessing the telecom system if the user is not authorized to do so, and c) access control to a requested service checking whether the user is authorized to use the requested service; and performing said access controls a) through c) and if the user passes said access controls a) through c) then allowing the user access to the requested service provided by the communications system.

* * * * *